J. G. KING.
SEED PLANTER.
APPLICATION FILED SEPT. 6, 1918.

1,297,863.

Patented Mar. 18, 1919.
3 SHEETS—SHEET 1.

Inventor
James G. King

Witness
Edwin G. McKee
Thos. E. Tripp

By Victor J. Evans
Attorney

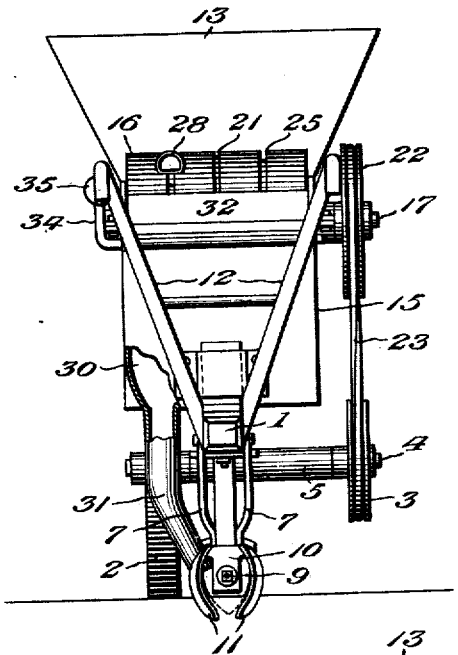
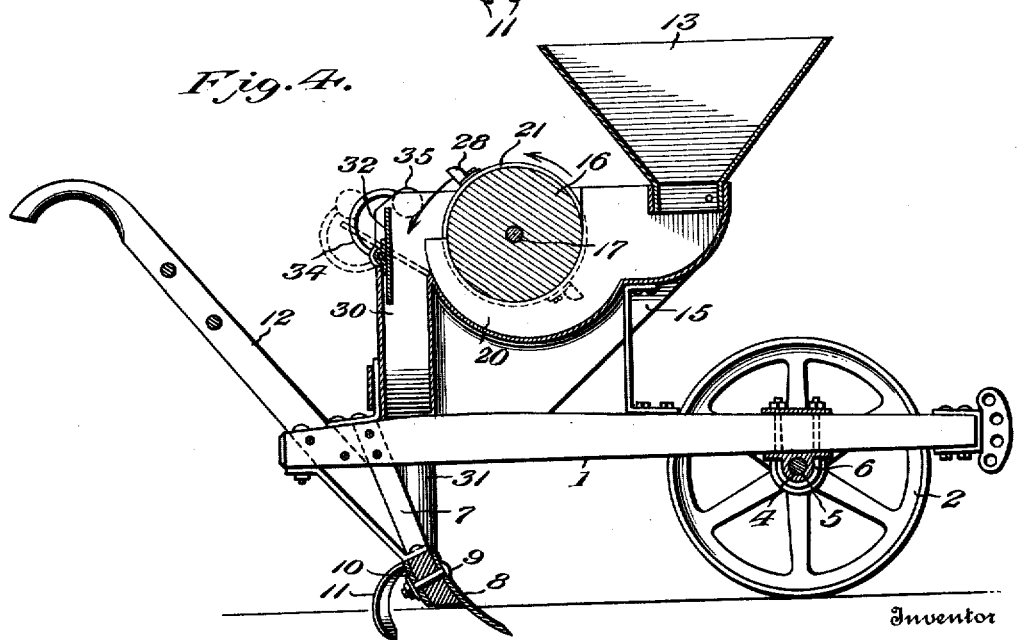

J. G. KING.
SEED PLANTER.
APPLICATION FILED SEPT. 6, 1918.
1,297,863.
Patented Mar. 18, 1919.
3 SHEETS—SHEET 3.
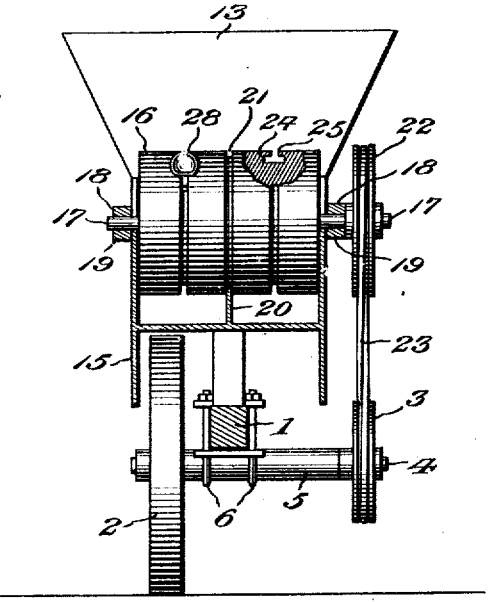
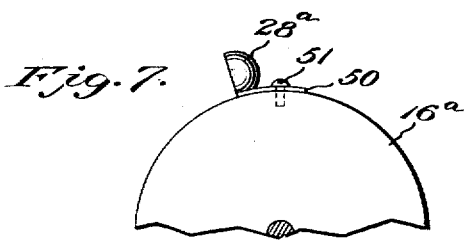
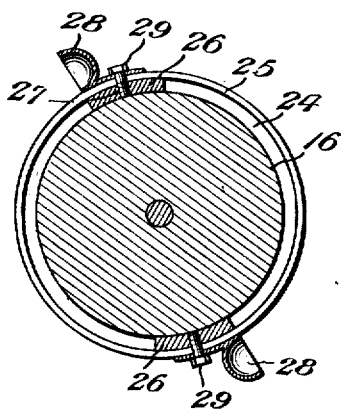
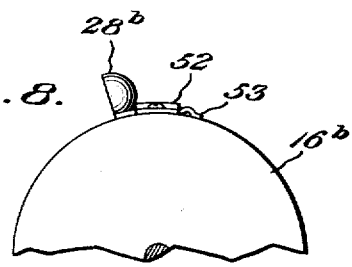
Witness
Edwin F. McKee
Thomas E. Tripp
Inventor
James G. King
By Victor J. Evans
Attorney

UNITED STATES PATENT OFFICE.

JAMES G. KING, OF TROY, ALABAMA.

SEED-PLANTER.

1,297,863.  Specification of Letters Patent.  Patented Mar. 18, 1919.

Application filed September 6, 1918. Serial No. 252,916.

*To all whom it may concern:*

Be it known that I, JAMES G. KING, a citizen of the United States, residing at Troy, in the county of Pike and State of Alabama, have invented new and useful Improvements in Seed-Planters, of which the following is a specification.

My present invention pertains to seed planters; and it has for its general object to provide a simple and inexpensive planter adapted to embody as one of its elements an ordinary plow stock, and constructed and arranged to successfully plant corn, peas, peanuts, beans, sorghum, wheat, barley, rye, as well as cotton, provided the cotton seed are rolled precedent to the planting thereof.

The invention also contemplates the provision of a planter constructed and arranged to plant two kinds of seed at the same time.

The invention further contemplates the provision of a planter having a seed feeding drum and peculiar and advantageous cups carried upon the perimeter of the drum and adjustably connected therewith, whereby the seeds may be planted at predetermined distances apart.

Other objects and advantages of the invention will be fully understood from the following description and claims when the same are read in connection with the drawings accompanying and forming part of this specification, in which:

Fig. 3 is a rear elevation of the planter.

Fig. 4 is a longitudinal vertical section of the planter.

Fig. 5 is a vertical transverse section of the same.

Fig. 6 is a detail vertical section illustrative of the manner in which I prefer to adjustably connect the cups to the perimeter of the drum by which the same are carried.

Fig. 7 and 8 are detail views of modified cups.

Similar numerals of reference designate corresponding parts in all of the views of the drawings.

Figure 1:
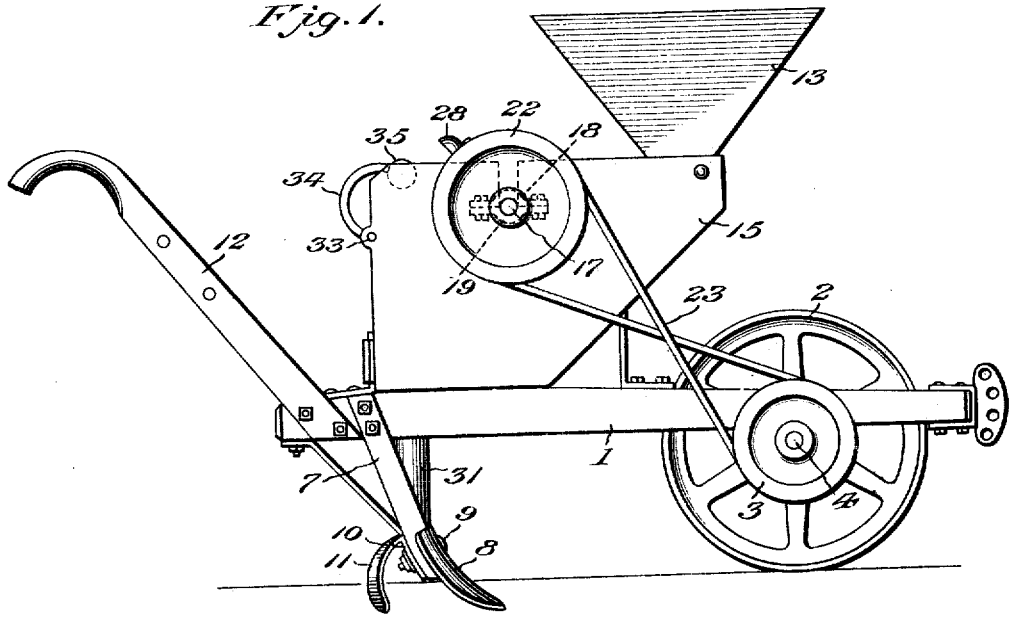
Figure 1 is a side elevation of the seed planter constituting the best practical embodiment of my invention that I have as yet devised.
Figure 2:
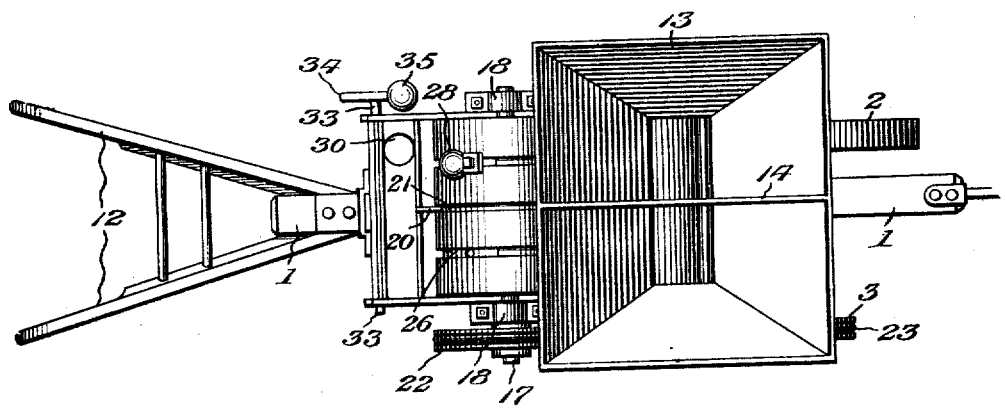
Fig. 2 is a top plan view of the same.

In carrying out my invention I prefer for the sake of cheapness to employ an ordinary plow stock as the beam 1, and to have the different elements that enter into the planter so constructed and arranged that they may be readily attached to the said stock. This, however, is not of the essence of my invention and I would, therefore, have it understood that the elements in addition to the beam may be permanently connected with the beam in any approved manner compatible with my invention without involving departure from the scope of the same as claimed.

The beam 1 is equipped on its forward portion with a ground wheel 2 and a circumferentially grooved drive wheel 3; said wheels 2 and 3 being fixed upon a transverse shaft 4, journaled in a bearing 5 that is connected by a shackle 6 or other means to the beam.

Fixed to and depending from the rear portion of the beam 1 are hangers 7 by which is carried a furrow opening plow 8, and also connected with the hangers 7, preferably by the same bolt 9 that connects the plow 8 is the body 10 of curved covering shovels 11, the said shovels 11 being spaced apart and being disposed at opposite sides of the point of the plow 8 so as to enable them to efficiently perform the function ascribed to them.

Fixed to and extending upwardly and rearwardly from the rearmost portion of the beam 1 are the handles 12 of the planter.

Located in a plane above the beam 1 is the hopper 13 of the planter; the said hopper being preferably, though not necessarily, divided by a longitudinal vertical partition 14 into two compartments. This provision is made in order that two kinds of seed, corn and peas, for instance, may be simultaneously planted through the medium of the apparatus.

Fixed to the hopper 13 in communication with the eduction orifice or orifices thereof, and also fixed upon and carried by the beam, 1 is the seed receptacle 15 of the apparatus, the bottom wall of which is preferably curved concentrically to the perimeter of the drum 16. The said drum 16 is carried by a shaft 17, dropped into slots in the side walls of the receptacle 15, and held by bearing caps 18 upon bearing members 19 that are fixed to said side walls. In the receptacle 15 is a longitudinal central partition 20, and receiving the edge of the said partition 20 is a circumferential channel 21 in the center of the perimeter of drum 16. This provision is resorted to in order to separate in an effectual manner the two kinds of seeds when the same are contained in the receptacle 15. Fixed upon the shaft 17 is a circumferentially grooved band wheel 22, which is connected through a belt 23 with the drive wheel 3, whereby when the planter is moved forwardly the drum 16 will be rotated about its axis.

As clearly illustrated in the drawings the peripheral portion of the drum 16 is provided with channels 24, and these channels 24 are each in communication with a comparatively narrow channel 25 formed in the periphery of the drum. Movable in the channels 24 and about the axis of the drum are anchor blocks 26 each of which is provided with a threaded aperture 27. Arranged against the perimeters of the drum 16 are the cups 28 which constitute an important feature of my invention. The said cups 28 are of varying sizes so as to enable the same to handle efficiently seeds of different sizes. Each cup 28 is connected to one anchor block 24; the connection being effected through the medium of a headed bolt 29 which extends through the comparatively narrow channel 25 and is threaded into its complementary block 24. When the bolt 29 is turned home into the block 26 it follows that the cup 28 engaged by the said bolt will be clamped and securely fixed in an adjustable manner to the perimeter of the drum. When, however, the said bolt is loosened its respective cup 28 may be moved around the drum to the position desired and may then be expeditiously and easily fixed again to the drum. Manifestly this provision permits of the cups in each circular series being arranged at different distances apart in order that the seeds may be deposited at different distances apart in the furrow as occasion demands.

During the operation of the planter the drum cups 28 receive seed from the receptacle 15 and discharge the said seed to a compartment 30 arranged in rear of and carried by the receptacle 15, and from the said compartment 30 the bottom of which is suitably dished, a spout 31 leads downwardly to the point illustrated, this in order to assure the delivery of the seed to the furrow immediately in rear of the plow 8.

At 32 is a cut-off plate which is adapted in its closed position to chute the seed discharged by the trucks 28 back into the receptacle 15.

The said cut-off plate 32 has trunnions 33 by which it is connected in hinged manner to the side walls of the compartment 30, and on one of the trunnions is a lever arm 34 on which is a weight 35, which is adapted by reason of its location on the curvilinear arm 34, to hold the cut-off plate 32 open and closed. Manifestly when the weight 35 is in front of the center of movement of the cut-off, the weight will operate to prevent casual movement of the plate from its open position, and when said weight 35 is swung to a position back of the center of movement of the cut-off plate, the weight will serve to hold said plate in its closed position.

In the practical operation of my novel planter, the seed to be planted are deposited in the hopper 13, and then when the machine is drawn or moved forwardly by a draft animal or other means, with the cut-off plate 32 open, the two kinds of seed will be deposited in the furrow formed by the plow 8. It will be noticed in this connection that the construction is such that the operator is enabled to observe the discharge of the seed from the cups 28 to the compartment 30, so that when for any reason there is an interruption in the supply of seed, the planter may be stopped and the difficulty overcome. When the cut-off plate 32 is closed the planter may be readily moved from one point to another without delivery of seed to the spout 31.

While I prefer to so construct my novel planter as to adapt the same to synchronously plant two kinds of seed, I do not desire to be understood as confining myself to the same inasmuch as certain features of my invention may be incorporated to advantage in a planter that is adapted to plant only one kind of seed.

In Fig. 7, the cup 28$^a$ is provided with a shank 50 arranged against and fastened to the periphery of the drum 16$^a$ preferably through the medium of a screw 51.

In the modification shown in Fig. 8, a socket plate 52 is fastened to the periphery of the drum 16$^b$ and the cup 28$^b$ has a shank 53 disposed and held by frictional contact in the socket plate and to the drum.

Having described my invention, what I claim and desire to secure by Letters-Patent is:

1. In a seed planter the combination of a supporting means, a drive wheel, a receptacle fixed upon the supporting means and having a curved bottom and also having a longitudinal central partition curved in conformity to said bottom, a hopper carried by the upper forward portion of said receptacle and having compartments in communication with the receptacle at opposite sides of the partition thereof, a drum mounted in the receptacle and having a circumferential channel receiving the receptacle partition, cups carried by the drum at opposite sides of the said channel, a driving connection intermediate the said drive wheel and the drum, and means positioned to receive seed discharged by the cups and to deliver the same.

2. In a seed planter the combination of a supporting means, a drive wheel, a receptacle fixed upon the supporting means and having a curved bottom and also having a longitudinal central partition curved in conformity to said bottom, a hopper carried by the upper forward portion of said receptacle and having compartments in communication with the receptacle at opposite sides of the partition thereof, a drum mounted in the receptacle and having a circumferential channel receiving the receptacle partition, cups carried by the drum at opposite sides of the said channel, a driving connection intermediate the said drive wheel and the drum, a compartment carried by and located in rear of the receptacle and positioned to receive seed from the cup, a spout extending downwardly from said compartment, a cut-off plate complementary to the compartment and constructed and arranged in its closed position to chute seeds back into the receptacle, and means connected with the cut-off plate for holding the same against casual movement when open or closed.

3. In a seed planter the combination of a supporting means, a drive wheel, a receptacle fixed upon the supporting means and having a curved bottom and also having a longitudinal central partition curved in conformity to said bottom, a hopper carried by the upper forward portion of said receptacle and having compartments in communication with the receptacle at opposite sides of the partition thereof, a drum mounted in the receptacle and having a circumferential channel receiving the receptacle partition, cups carried by the drum at opposite sides of the said channel, a driving connection intermediate the said drive wheel and the drum, and a compartment positioned in rear of the receptacle, and having a spout extending downwardly therefrom.

4. In a seed planter, the combination of a receptacle, a drum mounted therein and having seed delivering means at its perimeter, means positioned to receive seed from said delivery means and to conduct the same downwardly, a cut-off plate mounted to swing and control the mouth of said conducting means and also adapted when closed to chute seed back into the receptacle, a curved lever arm fixed to one end of the said cut-off plate at the center of movement thereof, and extended over the upper edge and beyond the plane of the plate, and a weight on the swinging end of said lever arm, the lever arm and weight being adapted to yieldingly hold the cut-off plate both open and closed.

In testimony whereof I affix my signature.

JAMES G. KING.

Copies of this patent may be obtained for five cents each, by addressing the "Commissioner of Patents, Washington, D. C."